(12) United States Patent
Coers et al.

(10) Patent No.: US 8,147,176 B2
(45) Date of Patent: Apr. 3, 2012

(54) WORK MACHINE AND UNLOADING SYSTEM FOR UNLOADING AN AGRICULTURAL PRODUCT FROM A WORK MACHINE

(75) Inventors: Bruce A. Coers, Hillsdale, IL (US); Daniel J. Burke, Cordova, IL (US); Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 942 days.

(21) Appl. No.: 12/140,500

(22) Filed: Jun. 17, 2008

(65) Prior Publication Data

US 2009/0311084 A1 Dec. 17, 2009

(51) Int. Cl.
*B60P 1/46* (2006.01)
*A01F 12/46* (2006.01)

(52) U.S. Cl. ........................ 414/502; 460/119
(58) Field of Classification Search .................. 414/502, 414/505; 460/119
See application file for complete search history.

(56) References Cited

U.S. PATENT DOCUMENTS

| | | | | |
|---|---|---|---|---|
| 4,037,745 A | * | 7/1977 | Hengen et al. | 414/504 |
| 5,016,909 A | * | 5/1991 | Lin | 280/5.508 |
| 5,116,188 A | | 5/1992 | Kurohashi | |
| 5,195,864 A | | 3/1993 | Drake | |
| 6,012,272 A | * | 1/2000 | Dillon | 56/14.6 |
| 6,042,326 A | * | 3/2000 | Thomas et al. | 414/502 |
| 6,339,917 B1 | * | 1/2002 | Dillon et al. | 56/14.6 |
| 6,352,018 B1 | * | 3/2002 | Krisher | 92/130 R |
| 6,358,143 B1 | * | 3/2002 | Hurlburt | 460/114 |
| 2006/0070757 A1 | * | 4/2006 | Posselius et al. | 172/677 |
| 2010/0009731 A1 | * | 1/2010 | Coers et al. | 460/1 |
| 2011/0083411 A1 | * | 4/2011 | Mackin et al. | 56/10.2 R |

* cited by examiner

*Primary Examiner* — Charles A Fox
(74) *Attorney, Agent, or Firm* — Taylor IP, P.C.

(57) ABSTRACT

An agricultural work machine includes a hopper configured to store an agricultural product during harvesting operations, and an unloading system configured to receive the agricultural product from the hopper and to unload the agricultural product from the work machine. The unloading system includes a turret rotatably attached to a portion of the work machine; a base conveyor belt system configured to convey the agricultural product away from the turret; a base support structure pivotably coupled to the turret, the base support structure being configured to support at least in part the base conveyor belt system; and a shock absorption system configured to absorb a shock load transmitted between the base support structure and the turret.

10 Claims, 5 Drawing Sheets

WORK MACHINE AND UNLOADING SYSTEM FOR UNLOADING AN AGRICULTURAL PRODUCT FROM A WORK MACHINE

FIELD OF THE INVENTION

The present invention relates to a work machine, and, more particularly, to an unloading system for unloading an agricultural product from a work machine.

BACKGROUND OF THE INVENTION

Agricultural work machines, such as combines, are employed in the agricultural industry for various tasks, including harvesting crops. During harvesting operations, typical such agricultural work machines move through a crop field while operating a header at the front of the work machine to cut the crop. Once cut, the agricultural product, e.g., grain, is removed from the non-grain crop materials by threshing, separating and cleaning assemblies on the work machine, and then transferred to the work machine's hopper for temporary storage.

At various times during harvesting operations, such as when the work machine's hopper is full, the operator of the work machine will unload the agricultural product from the work machine using a cantilevered unloading system that is mounted on the work machine. Typically, the agricultural product is unloaded via the unloading system into a recipient device, such as the trailer of a tractor-trailer or a mobile hopper wagon, e.g., tractor pulled, which delivers the agricultural product to a storage facility or another transport system. At times, the recipient device may travel beside the work machine during simultaneous harvesting and unloading operations.

It is desirable that the reach of the unloading system extends beyond the width of the header, for example, so that the agricultural product may be conveniently delivered to the recipient device without undue maneuvering of the work machine or recipient, and to reduce the need for a tractor trailer to drive directly onto the field being farmed, which may result in undesirable soil compaction.

In order to improve farming efficiency, the width of modern header units are increasing. However, extending the reach of the unloading system to compensate for the increased width of the header may result in negative impacts, such as increasing the weight of the work machine by adding new structure and/or adding material thickness to existing structure to support longer unloading systems, etc. The increased weight of the work machine would contribute to the undesirable soil compaction.

Accordingly, there is a need in the art for an improved work machine and unloading system for unloading an agricultural product from a work machine.

SUMMARY OF THE INVENTION

The present invention provides a work machine and unloading system for unloading an agricultural product from a work machine.

The invention, in one form thereof, is directed to an agricultural work machine. The agricultural work machine includes a hopper configured to store an agricultural product during harvesting operations, and an unloading system configured to receive the agricultural product from the hopper and to unload the agricultural product from the work machine. The unloading system includes a turret rotatably attached to a portion of the work machine; a base conveyor belt system configured to convey the agricultural product away from the turret; a base support structure pivotably coupled to the turret, the base support structure being configured to support at least in part the base conveyor belt system; and a shock absorption system configured to absorb a shock load transmitted between the base support structure and the turret.

The invention, in another form thereof, is directed to an unloading system configured to receive an agricultural product from a hopper of an agricultural work machine and to unload the agricultural product from the agricultural work machine. The unloading system includes a turret rotatably attached to a portion of the work machine; a base conveyor belt system configured to convey the agricultural product away from the turret; a base support structure pivotably coupled to the turret, the base support structure being configured to support at least in part the base conveyor belt system; and a shock absorption system configured to absorb a shock load transmitted through the base support structure.

The invention, in yet another form thereof, is directed to an agricultural work machine. The agricultural work machine includes: a hopper configured to store an agricultural product during harvesting operations; and an unloading system configured to receive the agricultural product from the hopper and to unload the agricultural product from the work machine. The unloading system includes a first stage delivery system configured to receive the agricultural product from the hopper; a second stage delivery system configured to receive the agricultural product from the first stage delivery system and to offload the agricultural product from the agricultural work machine; a turret configured to rotatably couple the second stage delivery system to the agricultural work machine; and a shock absorption system configured to absorb a shock load transmitted through the second stage delivery system.

DETAILED DESCRIPTION OF THE INVENTION

Figure 1:
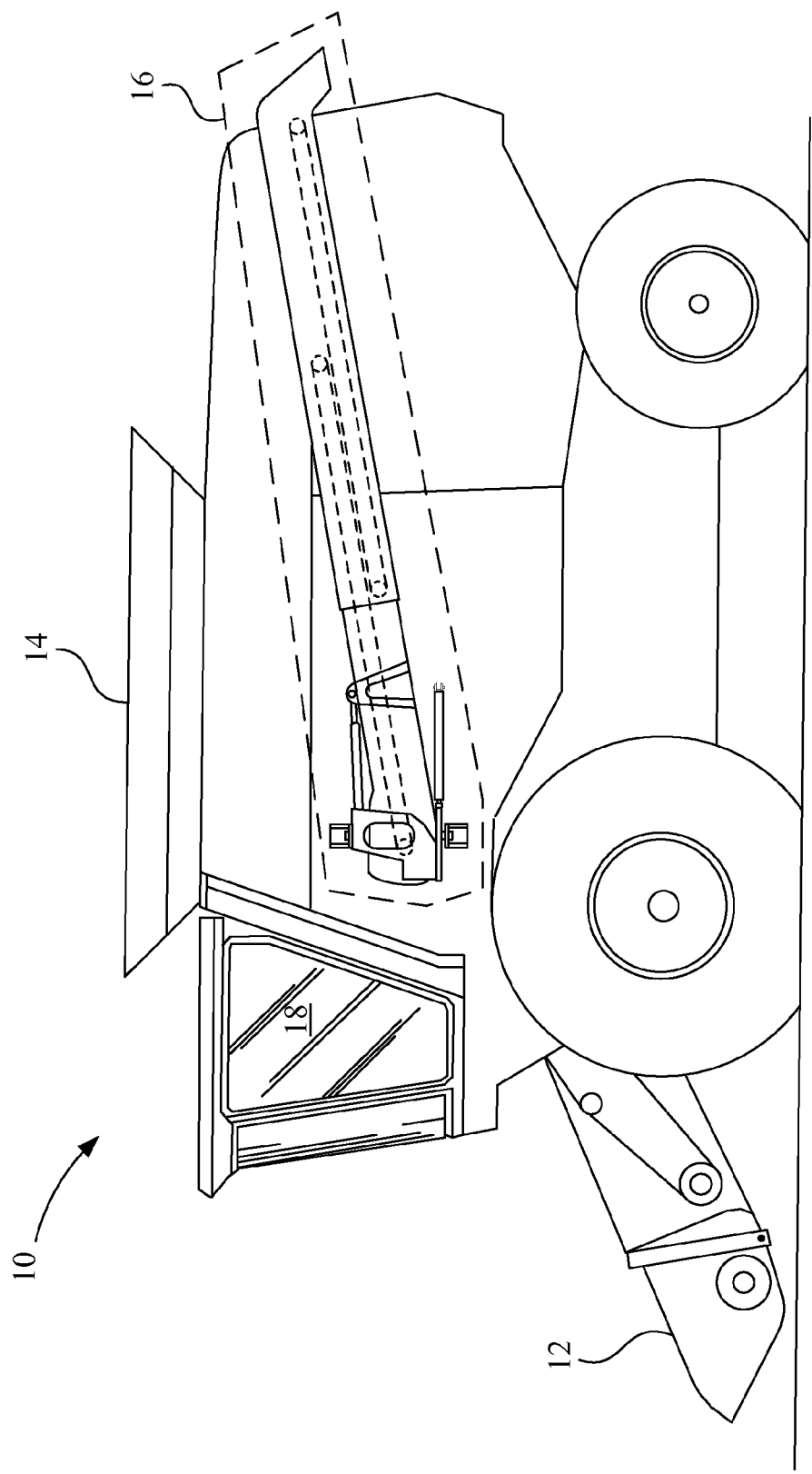
FIG. 1 depicts an agricultural work machine with an unloading system in accordance with an embodiment of the present invention.

Referring now to FIG. 1, there is schematically shown an agricultural work machine 10 in accordance with an embodiment of the present invention. In the present embodiment, agricultural work machine 10 is in the form of a self-powered combine, although it will be understood that the present invention is applicable to other types of agricultural work machines, self-powered or otherwise.

Work machine 10 may include a header 13 (FIG. 5) attached to a feeder house 12, a hopper 14, an unloading system 16, and a cab 18 for housing the operator of work machine 10. The header may be configured in a known manner to cut the crop being harvested, which is: transferred to threshing, separating and cleaning assemblies (not shown) that separate the agricultural product, e.g., grain, from the chaff. Hopper 14 is configured to receive and store the agricultural product during harvesting operations. Unloading system 16 is configured to receive the agricultural product from hopper 14 and to unload the agricultural product from work machine 10. In FIG. 1, unloading system 16 is depicted in a stowed position.

Figure 2:
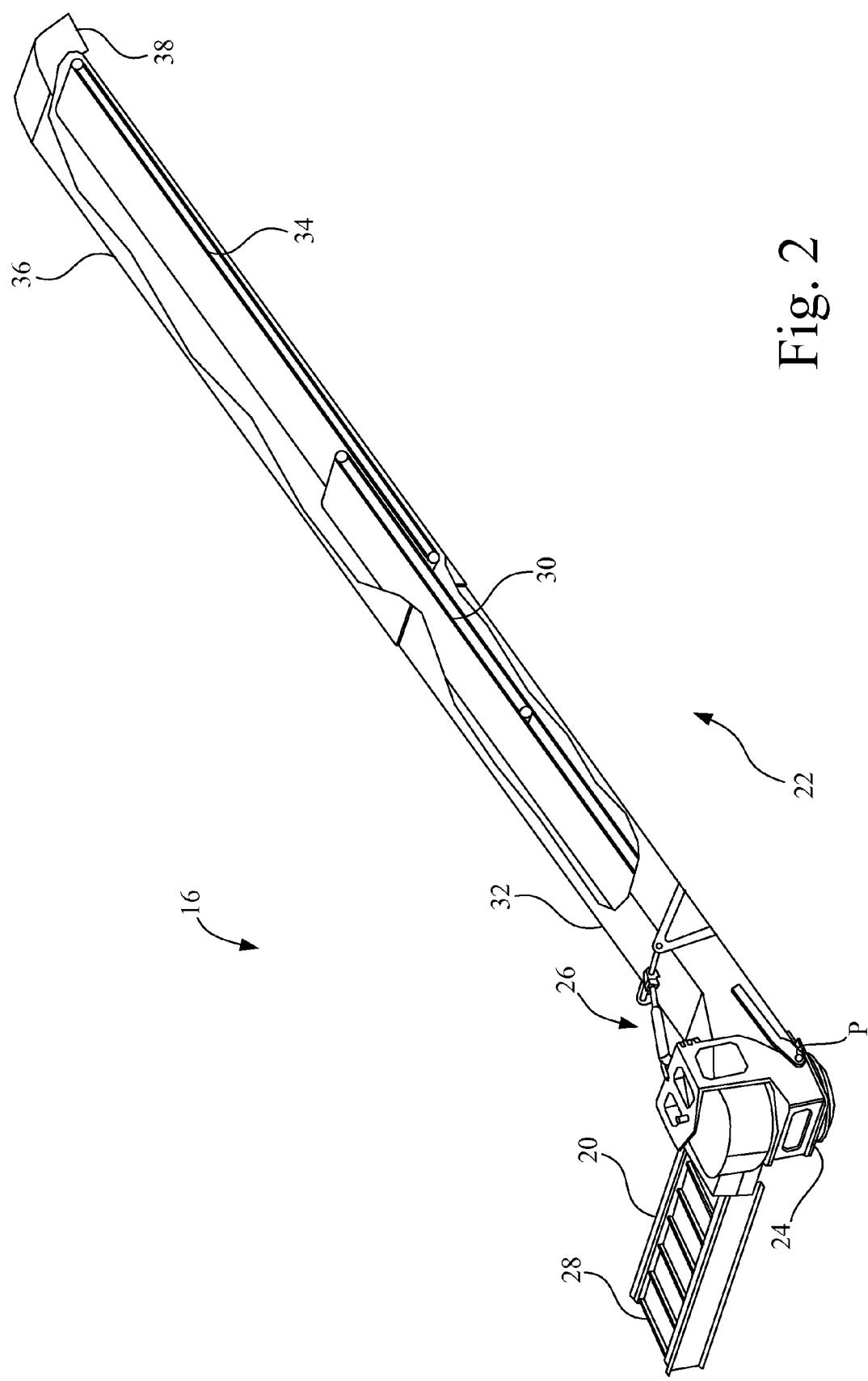
FIG. 2 depicts an unloading system for an agricultural work machine in accordance with the embodiment of FIG. 1.

Referring now to FIG. 2, unloading system 16 in accordance with an embodiment of the present invention is depicted. Unloading system 16 may include a first stage delivery system 20, a telescopic second stage delivery system 22, a turret 24 and a shock absorption system 26. Unloading system 16 is configured to receive the agricultural product from the hopper, and to unload the agricultural product from work machine 10.

First stage delivery system 20 is positioned at the bottom of or below hopper 14, and is configured to receive the agricultural product from hopper 14 and convey it to second stage delivery system 22. In the present embodiment, first stage delivery system 20 employs a conveyor belt 28 to transport the agricultural product, although it will be understood that other systems for conveying materials may be employed, e.g., auger-based systems.

Second stage delivery system 22 may include a base conveyor belt system 30, a base support structure 32, an extension conveyor belt system 34, an extension structure 36, and a discharge chute 38. It is considered that in other embodiments, auger-based systems may be employed instead of and/or in addition to conveyor belt systems. In any event, second stage delivery system 22 is configured to receive the agricultural product from first stage delivery system 20, and to offload the agricultural product from work machine 10 by discharging it to the recipient device via discharge chute 38. As described herein, second stage delivery system 22 is a telescopic system that is configured to selectively extend discharge chute 38 away from work machine 10 and retract discharge chute 38 towards work machine 10, e.g., in response to inputs from the operator of work machine 10.

Turret 24 is rotatably attached to a portion of work machine 10, e.g., a chassis (not shown), and is configured to rotatably couple second stage delivery system 22 to work machine 10, for example, so as to permit second stage delivery system 22 to rotate about a vertical axis from a stowed position to an operational position in which the agricultural product is unloaded from work machine 10.

Base conveyor belt system 30 is configured to convey the agricultural product away from first stage delivery system 20 and turret 24, and toward discharge chute 38. Extension conveyor belt system 34 is configured to extend the reach of unloading system 16 beyond that of base conveyor belt system 30, and is configured to receive the agricultural product from base conveyor belt system 30 and to convey the agricultural product away from base conveyor belt system 30 and into discharge chute 38.

Base support structure 32 is pivotably coupled to turret 24 via a pivot pin P that establishes a horizontal pivot axis so as to allow second stage delivery system 22 to pivot up or down about the horizontal pivot axis in order to raise or lower discharge chute 38. In addition, base support structure 32 is configured to support at least in part base conveyor belt system 30. For example, one end of base conveyor system may be supported directly by turret 24, whereas the other end of base conveyor belt system may be supported by base support structure 32.

Extension structure 36 supports extension conveyor belt system 34, and hence is slidably attached to base support structure 32 and configured to extend from base support structure 32, e.g., in a manner somewhat similar to that of an extension ladder, which provides second stage delivery system 22 with telescopic capability.

As depicted in FIG. 2, base support structure 32 and extension structure 36 are formed as an extruded metal structure, e.g., an aluminum extrusion. However, other structures may be employed without departing from the scope of the present invention.

Figure 3:
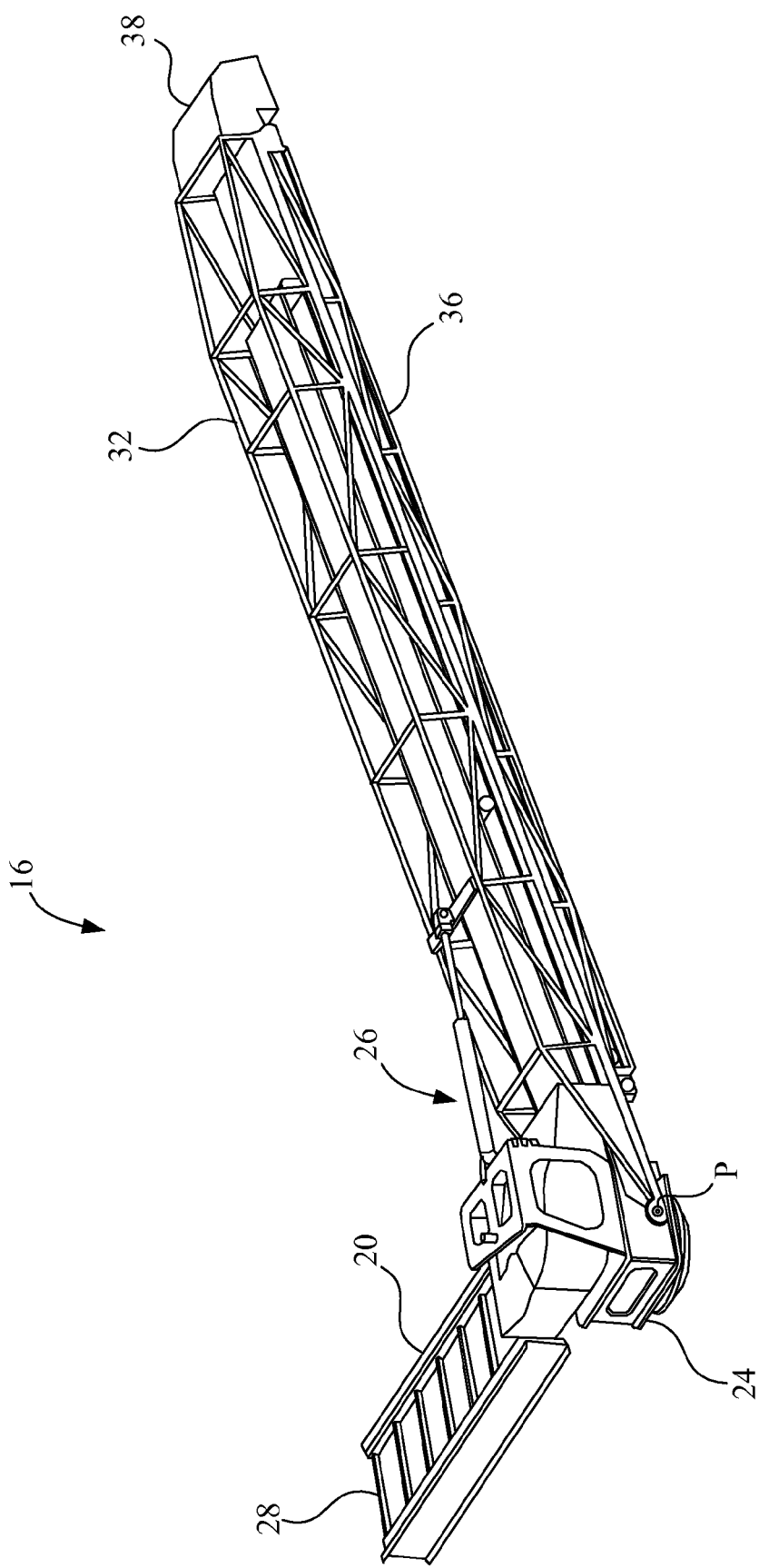
FIG. 3 depicts another embodiment of an unloading system in accordance with the present invention.

For example, with reference to FIG. 3, base support structure 32 and extension structure 36 may be in the form of truss structures. In the depiction of FIG. 3, extension structure 36 is slidably coupled to the bottom of base support structure 32, whereas in the embodiment of FIG. 2, extension structure 36 is slidably coupled to and partially envelops base support structure 32.

In the present embodiment, shock absorption system 26 is a hydraulic shock absorption system, although other types of shock absorbing systems may be employed without departing from the scope of the present invention. Shock absorption system 26 includes a hydraulic cylinder 40 that is coupled between the turret 24 and the second stage delivery system 22, and is configured to raise and lower second stage delivery system 22 about the horizontal axis defined by the pivot pin P. In the present embodiment, hydraulic cylinder 40 is coupled to turret 24 and to base support structure 32, and is configured to raise and lower base support structure 32 and the balance of second stage delivery system 22 thereby.

Figure 4:
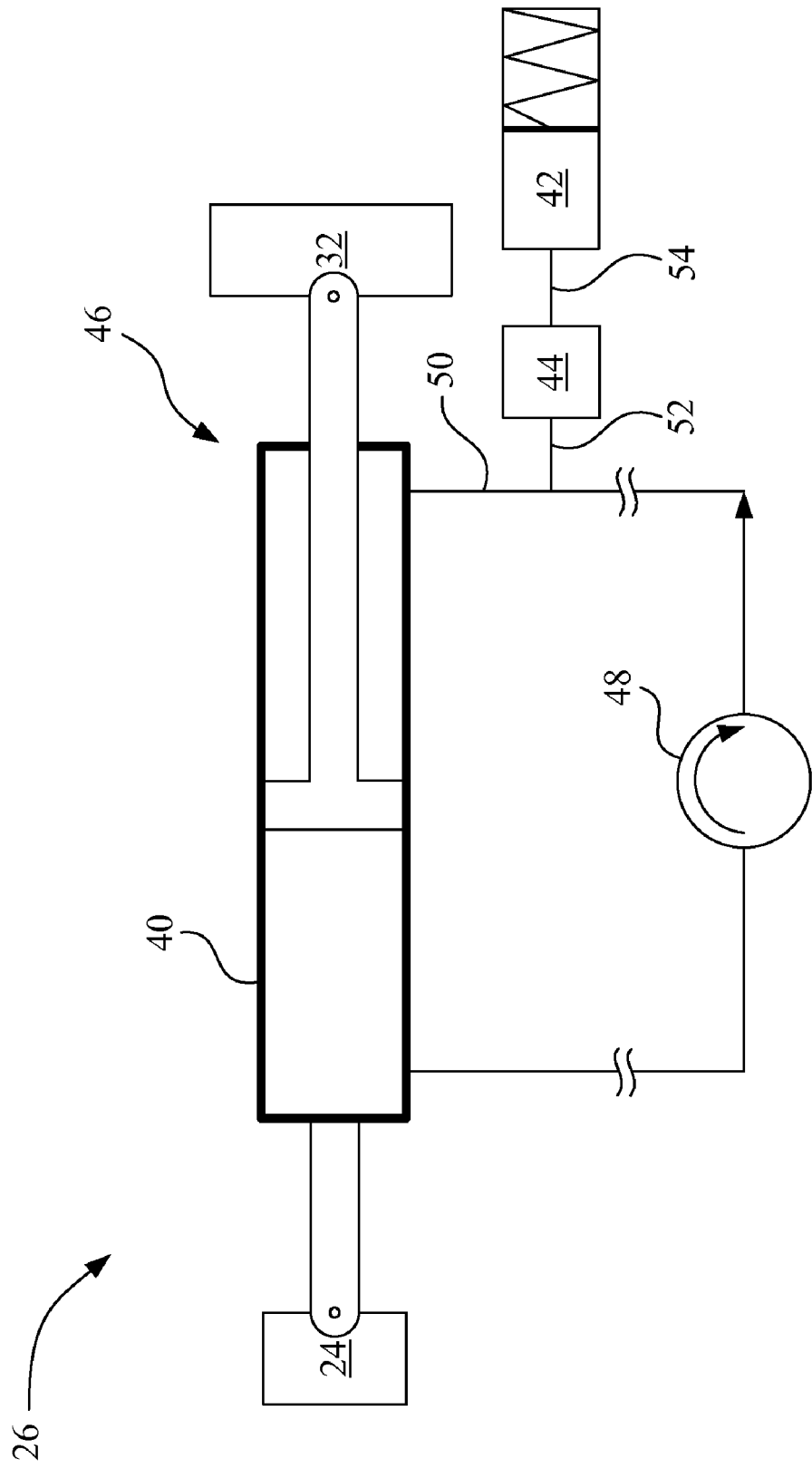
FIG. 4 depicts a shock absorption system for an agricultural work machine unloading system in accordance with an embodiment of the present invention.

Referring now to FIG. 4, shock absorption system 26 is described in greater detail. Shock absorption system 26 is configured to absorb shock loads that may be transmitted through second stage delivery system 22, in particular, shock loads transmitted between base support structure 32 and turret 24.

In addition to hydraulic cylinder 40, shock absorption system 26 includes a hydraulic accumulator 42 and a hydraulic damper 44. Hydraulic pressure for the operation of hydraulic cylinder 40 is supplied to a compression side 46 of hydraulic cylinder 40 by a hydraulic pump 48. Hydraulic accumulator 42 may be in fluid communication with compression side 46 via a hydraulic line 50, a hydraulic passage 52, hydraulic damper 44 and a hydraulic passage 54. Hydraulic accumulator 42 is configured to hydraulically absorb the shock loads transmitted through second stage delivery system 22. Hydraulic damper 44 may be in fluid communication with hydraulic accumulator 42 via hydraulic passage 54 and is configured to provide hydraulic damping. In the present embodiment, hydraulic accumulator 42 and hydraulic damper 44 form a spring/damper combination that may absorb and damp shock loads transmitted through second stage delivery system 22. Also, in the present embodiment, hydraulic damper 44 is in the form of an orifice that restricts the flow of hydraulic fluid to and from hydraulic accumulator 42 in order to provide damping, although other types of dampers may be employed without departing from the scope of the present invention.

In the present embodiment, hydraulic cylinder 40 is a single-acting hydraulic cylinder, and is pivotably coupled to base support structure 32 on one end, and pivotably coupled to turret 24 on the other end. In order to raise second stage delivery system 22, hydraulic fluid may be supplied by hydraulic pump 48 to compression side 46 to increase the pressure therein, causing hydraulic cylinder 40 to retract against the weight of second stage delivery system 22. As the pressure in compression side 46 increases, some hydraulic flow will pass through hydraulic damper 44 into hydraulic accumulator 42 until a pressure balance inside hydraulic accumulator 42 is achieved. Second stage delivery system 22 may be lowered by reducing the pressure in compression side 46.

Figure 5:
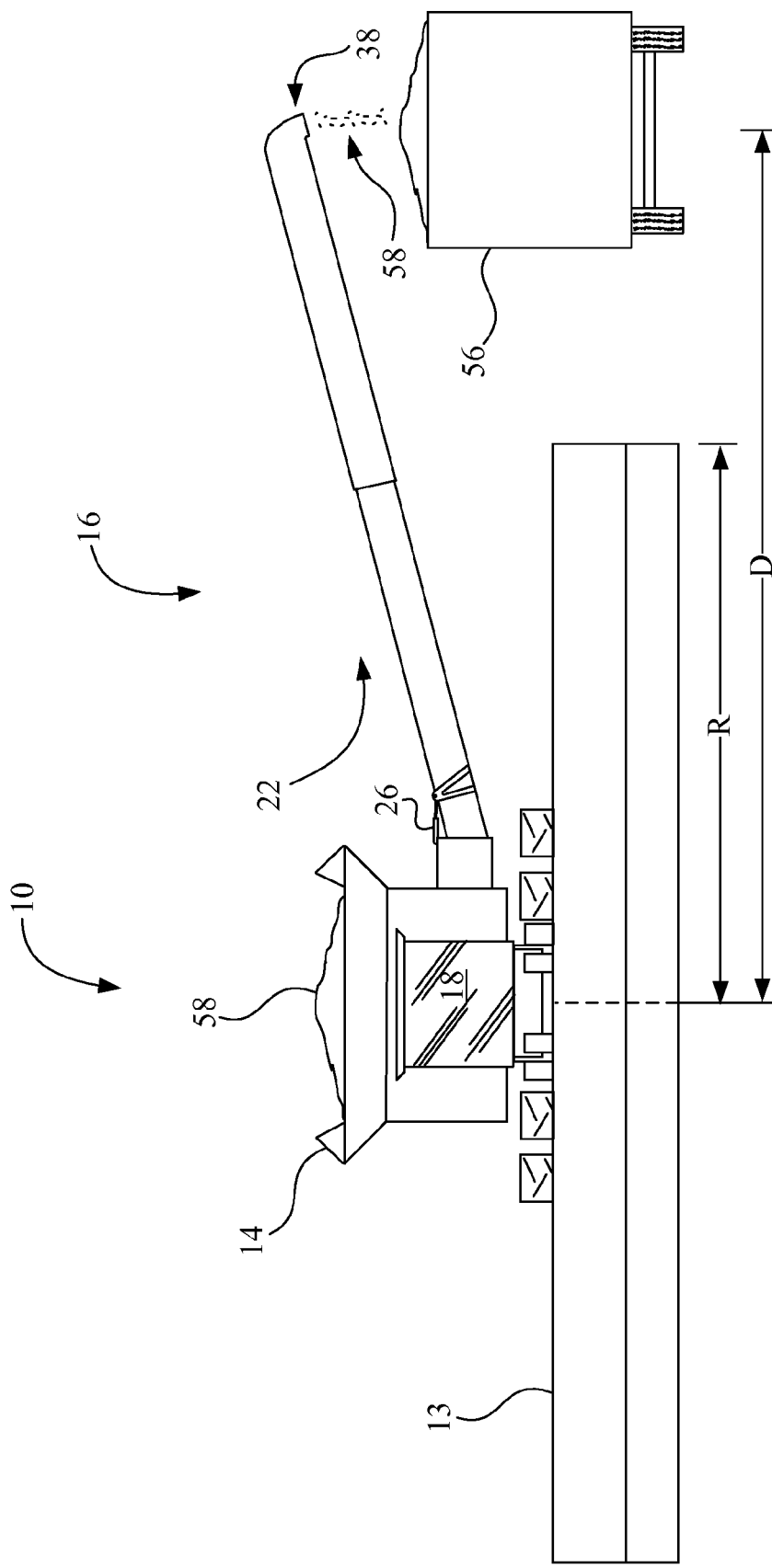
FIG. 5 depicts the agricultural work machine of FIG. 1 while employing an unloading system to unload agricultural product from the work machine in accordance with an embodiment of the present invention.

Referring now to FIG. 5, the operation of unloading system 16 during harvesting is described. In the depiction of FIG. 5, work machine 10 is moving forward while harvesting crop using header 13. The recipient of the agricultural product, e.g., a tractor-drawn hopper wagon 56, travels parallel to work machine 10. In order to unload the agricultural product, e.g., grain 58 from hopper 14, second stage delivery system 22 is rotated using turret 24 from the stowed position to the unloading position depicted in FIG. 5, and second stage delivery system 22 is telescopically extended, e.g., by extending extension structure 36 with extension conveyor belt system 34 and discharge chute 38. The amount that second stage delivery system 22 is extended may be controlled by the operator, e.g., based on the reach R of header 13 and a distance, e.g., distance D, to tractor-drawn hopper wagon 56.

Once discharge chute 38 is appropriately positioned over tractor-drawn hopper wagon 56, conveyor belt 28 of first stage delivery system 20 is engaged. Grain 58 from hopper 14 falls onto conveyor belt 28 and is transported towards base conveyor belt system 30 of second stage delivery system 22. Base conveyor belt system 30 receives the grain from conveyor belt 28 and conveys it to extension conveyor belt system 34 of second stage delivery system 22. Extension conveyor belt system 34 then conveys the grain to discharge chute 38, which directs grain 58 downward into tractor-drawn wagon 56.

While traveling in the field during the harvesting operation, variations in the surface of the field may generate a vertical displacement and/or rolling motion in work machine 10, which are transmitted to second stage delivery system 22 via turret 24. In certain cases, the vertical displacement and/or rolling motion may be somewhat violent, e.g., where an unexpected bump or hole is encountered by work machine 10. Absent shock absorption system 26, such violent displacements may cause damage to unloading system 16 and/or work machine 10, owing the substantial overhung moment caused by the cantilevered second stage delivery system 22.

For example, if a sudden bump were encountered by work machine 10, the sudden upward vertical displacement of work machine 10 would result in a shock load passing through turret 24 as the connection between second stage delivery system 22 and work machine 10, e.g., turret 24, attempts to accelerate second stage delivery system 22 upward.

However, as would be appreciated by one skilled in the mechanical arts, by virtue of the pivot joint P coupling second stage delivery system 22 to turret 24, the upward displacement of work machine 10 would result in a sudden increase in pressure in the compression side 46 of hydraulic cylinder 40, which would direct hydraulic flow to hydraulic accumulator 42 via hydraulic line 50, hydraulic passage 52, hydraulic damper 44 and hydraulic passage 54. Hydraulic Accumulator 42, thus serving as a hydraulic spring, would absorb the shock load as hydraulic energy. In addition, oscillations induced in second stage delivery system 22 by the displacement of work machine 10 would be damped by hydraulic damper 44, e.g., viscous damping.

Because the shock loads are absorbed by shock absorption system 26, the load-bearing capacity of the structure of unloading system 16 and the portion of work machine 10 to which unloading system 16 is mounted, e.g., the chassis (not shown), may be reduced, as compared to hard-mounted unloading systems, which may reduce the weight and cost of work machine 10. In addition, by reducing the weight of work machine 10, soil compaction due to the operation of work machine in farmed fields may be reduced.

Having described the preferred embodiment, it will become apparent that various modifications can be made without departing from the scope of the invention as defined in the accompanying claims.

The invention claimed is:

1. An agricultural work machine, comprising:
    a hopper configured to store an agricultural product during harvesting operations; and
    an unloading system configured to receive said agricultural product from said hopper and to unload said agricultural product from said work machine, said unloading system including:
    a first stage delivery system including a generally horizontal first stage conveyor belt located one of at or below said hopper and being configured to receive said agricultural product from said hopper and to deliver said agricultural product to a side location of said work machine;
    a turret rotatably attached to said side location of said work machine for rotation about a vertical axis;
    a base conveyor belt system including a base support structure pivotally coupled to said turret for swinging vertically about a horizontal pivot axis and being configured for receiving said agricultural product from said first stage conveyor belt and for conveying said agricultural product away from said first stage conveyor belt and said turret; and
    a shock absorption system configured to absorb a shock load transmitted between said base support structure and said turret, the shock absorption system including a hydraulic cylinder connected between said turret and the base support structure, a hydraulic accumulator fluidly connected to a compression end of said hydraulic cylinder and a hydraulic damper connected between the hydraulic cylinder and accumulator.

2. The agricultural work machine of claim 1, said unloading system further comprising an extension conveyor belt system configured to extend a reach of said unloading system beyond said base conveyor belt system, said extension conveyor belt system also being configured to receive said agricultural product from said base conveyor belt system and to convey said agricultural product away from said base conveyor belt system.

3. The agricultural work machine of claim 1, further comprising an extension conveyor belt system including an extension structure slidably attached to said base support structure for extension from said base support structure, said extension structure being configured to support at least in part said extension conveyor belt system; and said base support structure and said extension structure each being formed of one of an aluminum extrusion and an aluminum truss structure.

4. An unloading system configured to receive an agricultural product from a hopper of an agricultural work machine and to unload said agricultural product from said work machine agricultural work machine, comprising:
    a first stage delivery system including a generally horizontal first stage conveyor belt located one of at or below said hopper and being configured to receive said agricultural product from said hopper and to deliver said agricultural product to a side location of said work machine;
    a turret rotatably attached to said side location of said work machine for pivoting about a vertical axis;

a base conveyor belt system including a base support structure pivotally coupled to said turret for swinging vertically about a horizontal pivot axis and being configured for receiving said agricultural product from said first stage conveyor belt and for conveying said agricultural product away from said first stage conveyor belt and said turret; and a shock absorption system configured to absorb a shock load transmitted through said base support structure, the shock absorption system including a hydraulic cylinder connected between said turret and the base support structure and a hydraulic accumulator fluidly connected to a compression side of said hydraulic cylinder.

5. The unloading system of claim 4, said hydraulic shock absorption system further comprising a hydraulic damper in fluid communication with said hydraulic accumulator and said hydraulic cylinder, said hydraulic damper being configured to provide viscous damping of said shock load.

6. The unloading system of claim 4, said unloading system further comprising an extension conveyor belt system configured to extend a reach of said unloading system beyond said base conveyor belt system, said extension conveyor belt system also being configured to receive said agricultural product from said base conveyor belt system and to convey said agricultural product away from said base conveyor belt system.

7. The unloading system of claim 4, further comprising an extension structure slidably attached to said base support structure for extension from said base support structure, said extension structure being configured to support at least in part an extension conveyor belt system.

8. An agricultural work machine, comprising:
a hopper configured to store an agricultural product during harvesting operations; and
an unloading system configured to receive said agricultural product from said hopper and to unload said agricultural product from said work machine, said unloading system including:
a first stage delivery system including a generally horizontal first stage conveyor belt located one of at or below said hopper and configured to receive said agricultural product from said hopper and to deliver said agricultural product to a side location of said work machine;
a second stage delivery system configured to receive said agricultural product from said first stage delivery system and to offload said agricultural product from said agricultural work machine;
a turret configured to rotatably couple said second stage delivery system to said agricultural work machine at said side location for pivoting about a vertical pivot axis, with said second stage delivery system including a base support structure mounted to said turret for pivoting about a horizontal pivot axis; and
a shock absorption system configured to absorb a shock load transmitted through said second stage delivery system, the shock absorption system including a hydraulic cylinder connected between said turret and the base support structure, for swinging said base support structure vertically about said horizontal pivot axis, and a hydraulic accumulator fluidly connected to a compression side of said hydraulic cylinder.

9. The agricultural work machine of claim 8, said hydraulic shock absorption system further comprising a hydraulic damper in fluid communication with said hydraulic accumulator and with a compression side of said hydraulic cylinder, said hydraulic damper being configured to provide damping of said shock load.

10. The agricultural work machine of claim 8, said second stage delivery system including a discharge chute for discharging said agricultural product, wherein said second stage delivery system is a telescopic system that is configured to selectively extend said discharge chute away from said agricultural work machine and retract said discharge chute towards said agricultural work machine.

* * * * *